United States Patent
Ruppert et al.

(10) Patent No.: US 8,628,098 B2
(45) Date of Patent: Jan. 14, 2014

(54) FORK ASSEMBLY FOR AGRICULTURAL APPLICATOR

(75) Inventors: Rex L. Ruppert, Benson, MN (US); Greg Fischer, Lake City, SD (US)

(73) Assignee: CNH America LLC, New Holland, PA (US)

( * ) Notice: Subject to any disclaimer, the term of this patent is extended or adjusted under 35 U.S.C. 154(b) by 204 days.

(21) Appl. No.: 13/226,945

(22) Filed: Sep. 7, 2011

(65) Prior Publication Data
US 2013/0056969 A1    Mar. 7, 2013

(51) Int. Cl.
*B60B 33/00* (2006.01)
*B62D 33/06* (2006.01)

(52) U.S. Cl.
USPC .............................. 280/86; 280/62; 180/215

(58) Field of Classification Search
USPC ................. 280/86, 62; 180/210, 215
See application file for complete search history.

(56) References Cited

U.S. PATENT DOCUMENTS

| | | | |
|---|---|---|---|
| 2,882,063 A | 4/1959 | Strasel | |
| 3,295,482 A | 1/1967 | Dountas et al. | |
| 4,350,222 A | 9/1982 | Lutteke et al. | |
| 4,828,177 A | 5/1989 | Schuitemaker | |
| 5,022,333 A | 6/1991 | McClure et al. | |
| 5,240,087 A | 8/1993 | Parker | |
| 5,479,868 A | 1/1996 | Bassett | |
| 6,149,169 A | 11/2000 | Chelgren | |
| 6,371,571 B1 | 4/2002 | Tsan | |
| 6,474,432 B1 | 11/2002 | Schmidt et al. | |
| 7,021,722 B2 * | 4/2006 | Ruppert et al. | 303/2 |
| 7,093,319 B2 * | 8/2006 | Lemeur, Jr. et al. | 16/44 |
| 7,353,566 B2 * | 4/2008 | Scheiber et al. | 16/19 |
| 8,413,295 B2 * | 4/2013 | Campbell | 16/35 D |
| 2006/0000397 A1 * | 1/2006 | Ricke et al. | 111/200 |
| 2006/0000654 A1 * | 1/2006 | Ricke et al. | 180/89.12 |
| 2010/0230182 A1 | 9/2010 | Otto | |
| 2011/0049263 A1 | 3/2011 | Vander Zaag et al. | |

FOREIGN PATENT DOCUMENTS

WO    2010024836    3/2010

* cited by examiner

*Primary Examiner* — Kevin Hurley
(74) *Attorney, Agent, or Firm* — Rebecca Henkel

(57) ABSTRACT

A front fork assembly for use with a three-wheel agricultural floater has a yoke having a first yoke portion and a second yoke portion extending downwardly from generally opposite ends of an upper yoke portion. A first plurality of wheel mounting points is formed on the first yoke portion and a second plurality of wheel mounting points is formed on the second yoke portion. The front fork assembly further includes a first wheel mounting arrangement formed from selected mounting points of the first plurality and the second plurality of mounting points. A second wheel mounting arrangement, different from the first wheel mounting arrangement, is formed from selected mounting points of the first plurality and the second plurality of mounting points. In this regard, the front fork assembly provides more than one mounting position for a front floatation tire.

19 Claims, 3 Drawing Sheets

FORK ASSEMBLY FOR AGRICULTURAL APPLICATOR

BACKGROUND OF THE INVENTION

The present invention relates generally to agricultural applicators and, more particularly, to a fork assembly for an agricultural applicator.

Numerous types of agricultural applicators are available today. These can include a pull-type unit or a self-propelled unit. A certain known agricultural applicator is also referred to a "floater." The floater is a large vehicle that uses oversized floatation tires to carry the vehicle across firm to muddy agricultural environments. The floater has a chassis assembly configured to support one or more bulk storage tanks or bins of product for application in an agricultural environment, usually before planting in the spring or after harvest in the fall. The type of agricultural product e.g., fertilizer, herbicide, pesticide, nutrients, etc. can vary. The floater can also be utilized to tow various agricultural implements. The oversize-tired agricultural applicator is generally desired for its ability to maneuver heavy loads over extremely rough and difficult agricultural terrain with minimal soil compaction.

The size of the floatation tires are selected based the desired load capacity for the floater. In other words, the greater the load capacity for the floater, the larger the tire that is needed. Not all consumers however initially demand the largest possible load capacity. As a result, some consumers initially purchase a smaller capacity floater and then at some time thereafter modify the floater to handle additional weight. One particular floater has a pair of rear floatation tires and a single front and relatively oversized floatation tire. Modifying such a three-wheel floater has typically involved replacing the front fork assembly to which the front floatation tire is mounted with a replacement front fork assembly constructed for use with a larger floatation tire. Thus, not only must the consumer replace the smaller floatation tire, but the consumer must also replace the front fork assembly. Needless to say, modifying the floater in such a manner can be costly.

Additionally, having a floater that can be modified in such a way can be problematic for the manufacturer. While wanting to satisfy both the initial purchase and post-purchase desires of its consumers cannot be discounted, manufacturing and maintaining an inventory of two different front fork designs for the same floater can prove costly for the manufacturer.

Therefore, there is a need for a floater that can be modified to handle larger load capacities without requiring replacement of the floater chassis.

SUMMARY OF THE INVENTION

The present invention is directed to a floater having a front fork assembly capable of accommodating two different size wheel/tire combinations. The front fork assembly has at least two mounting arrangements that define at least two different mounting positions at which a floatation tire may be mounted. The invention therefore allows two different sized tires to be used with the same front fork assembly thereby nullifying the need to replace the front fork assembly when mounting a different sized tire. Moreover, the invention does not require any modifications to the tire or the axle.

Other objects, features, and advantages of the invention will become apparent to those skilled in the art from the following detailed description and accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION

Figure 1:
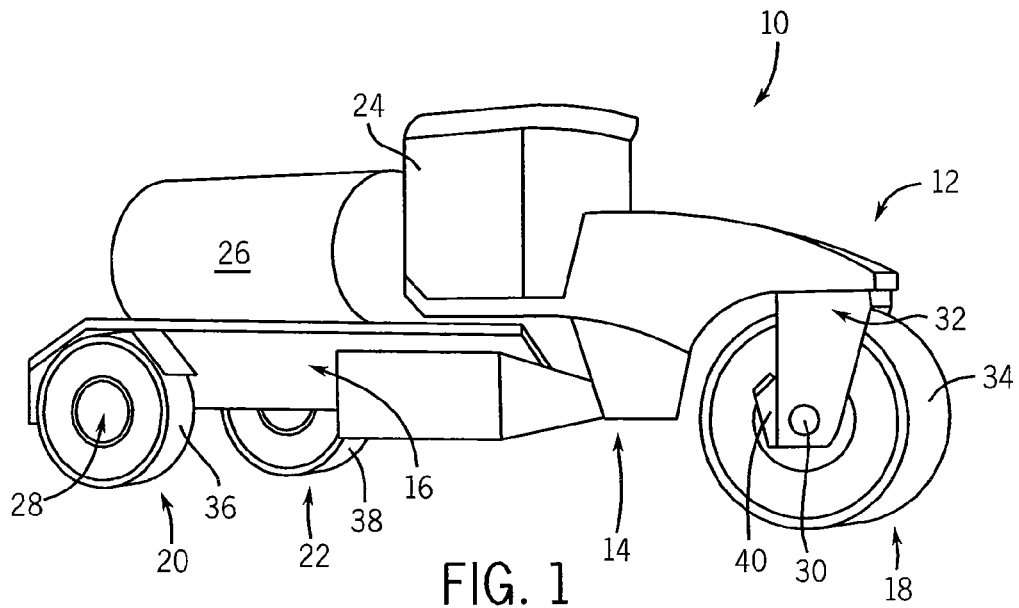
FIG. 1 is a pictorial view of an agricultural application system.

Referring to FIG. 1, an agricultural application system 10 includes an agricultural applicator, commonly referred to as a as a floater 12. The floater is a type of agricultural applicator commonly used to apply crop nutrients or animal or human waste (sludge) to soils, typically before planting in the spring and/or after harvest in the fall. The floater 12 generally includes a chassis assembly 14 having a frame 16 supported by a single front wheel assembly 18 and a pair of rear wheel assemblies 20, 22. The chassis assembly 14 supports a cab 24 and a bulk storage tank 26. The bulk storage tank 26 typically contains agricultural product such as liquid fertilizer or dry fertilizer for application in an agricultural environment.

FIG. 1 shows a preferred embodiment of the floater 12 with the chassis assembly 14 having a rear axle 28 mounted with the pair of rear wheel assemblies 20, 22, and a front axle or shaft 30 in support of the front wheel assembly 18. The frame 16 includes a front fork assembly 32 configured to mount the front shaft 30 and associated front wheel assembly 18. The front wheel assembly 18 typically is centrally mounted on the front shaft 30.

Each of the wheel assemblies 18, 20, 22 of the floater 12 employs respective oversized floatation tires 34, 36, 38, which are configured to carry the floater 12 across agricultural terrain that can vary from firm to soft, tilled, and sometimes muddy agricultural environments. The floatation tires are typically very wide and thus, in a preferred embodiment, the floater 12 does not include suspension for the front wheel assembly 18. Without front suspension, large dynamic loads associated with operation of the floater 12 are transmitted to the front fork assembly 32 and front shaft 30. These large dynamic loads (e.g., a floater 12 is known to carry loads up to 14,000 pound through rough terrain and/or mud) can cause deflection in the front shaft 12. To avoid debris from contaminating operation of the front wheel assembly 18, the front fork assembly 32 is configured to be as tight as possible and yet wide enough to let the mud pass and not build up. Reinforcement plates 40, 42 are coupled to the front fork assembly 32 to enhance the strength of the front fork assembly 32. Accordingly, the front fork assembly 32 is able to handle the dynamic forces associated with braking the floater 12 when fully-loaded or partially-loaded.

Figure 2:
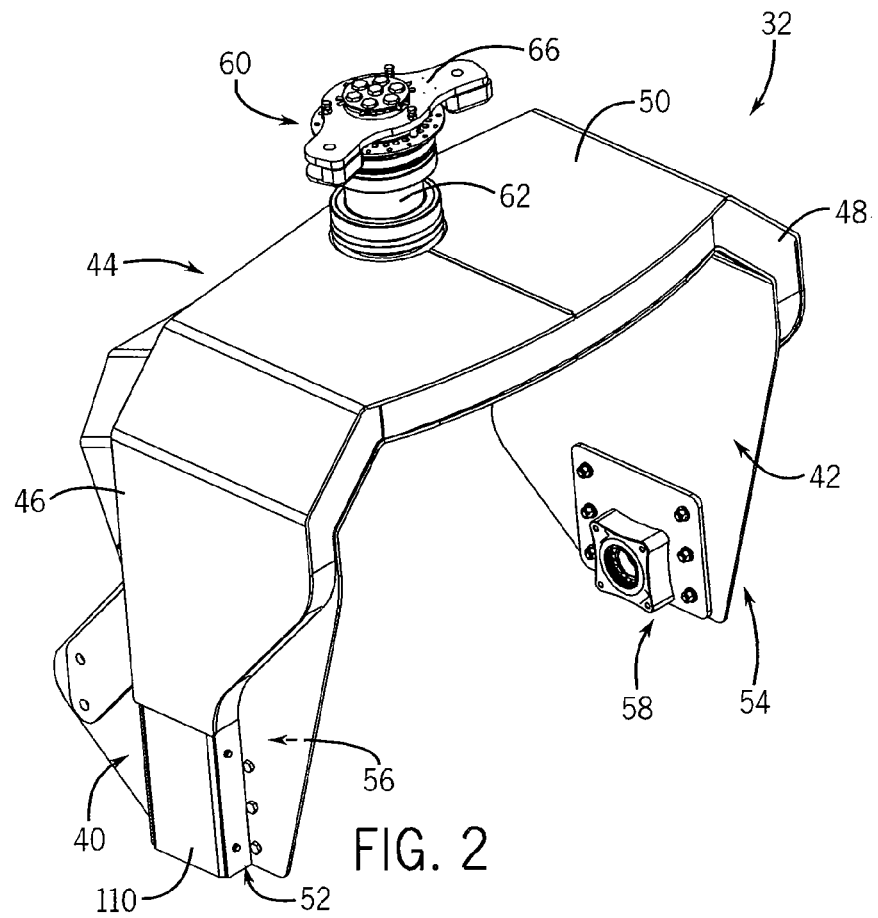
FIG. 2 is an isometric view of a front fork assembly of the agricultural application system of FIG. 1 according to the invention.

Turning now to FIG. 2, the front fork assembly 32 consists of a yoke 44 having a first yoke portion 46 and a second yoke portion 48 both of which extend in a generally perpendicular direction downward from an upper yoke portion 50. The free end 52 of the first yoke portion 46 and the free end 54 of the second yoke portion 48 mount on opposite ends (not shown)

of the front axle 30 of the single front wheel assembly 18. The front tire 34 is mounted at a generally central position along the front axle 30 between the reinforcement plates 40, 42. As will be described, the ends of the front axle 30 are mounted to respective bearing assemblies 56, 58.

The upper yoke portion 50 supports a kingpin assembly 60. The kingpin assembly 60 includes a kingpin 62 fastened (e.g., welded, etc.) to the upper surface 64 of the upper yoke portion 50. The kingpin 62 is configured to rotatably couple the front fork assembly 32 and mounted front wheel assembly 18 to the frame assembly of the floater 12 as is known in the art. More particularly, the kingpin assembly 60 is coupled to a steering arm 66 that is configured to receive a well-known left-hand side steering actuator and a well-known right-hand side steering actuator (not shown) (e.g., hydraulic cylinder, pneumatic cylinder, etc.) in a known manner. The steering actuators are connected to a steering wheel in the cab 24 of the floater 12 in a known manner such that rotation of the steering wheel is operable to extend or retract the steering actuators so as to rotate the steering arm 66 with respect to a straight-forward direction of travel. Accordingly, the rotating steering arm 66 rotates the attached kingpin 62 and front fork assembly 32 about upper bearing assembly 68 to cause a desired turn angle of the floater 12.

Figure 3:
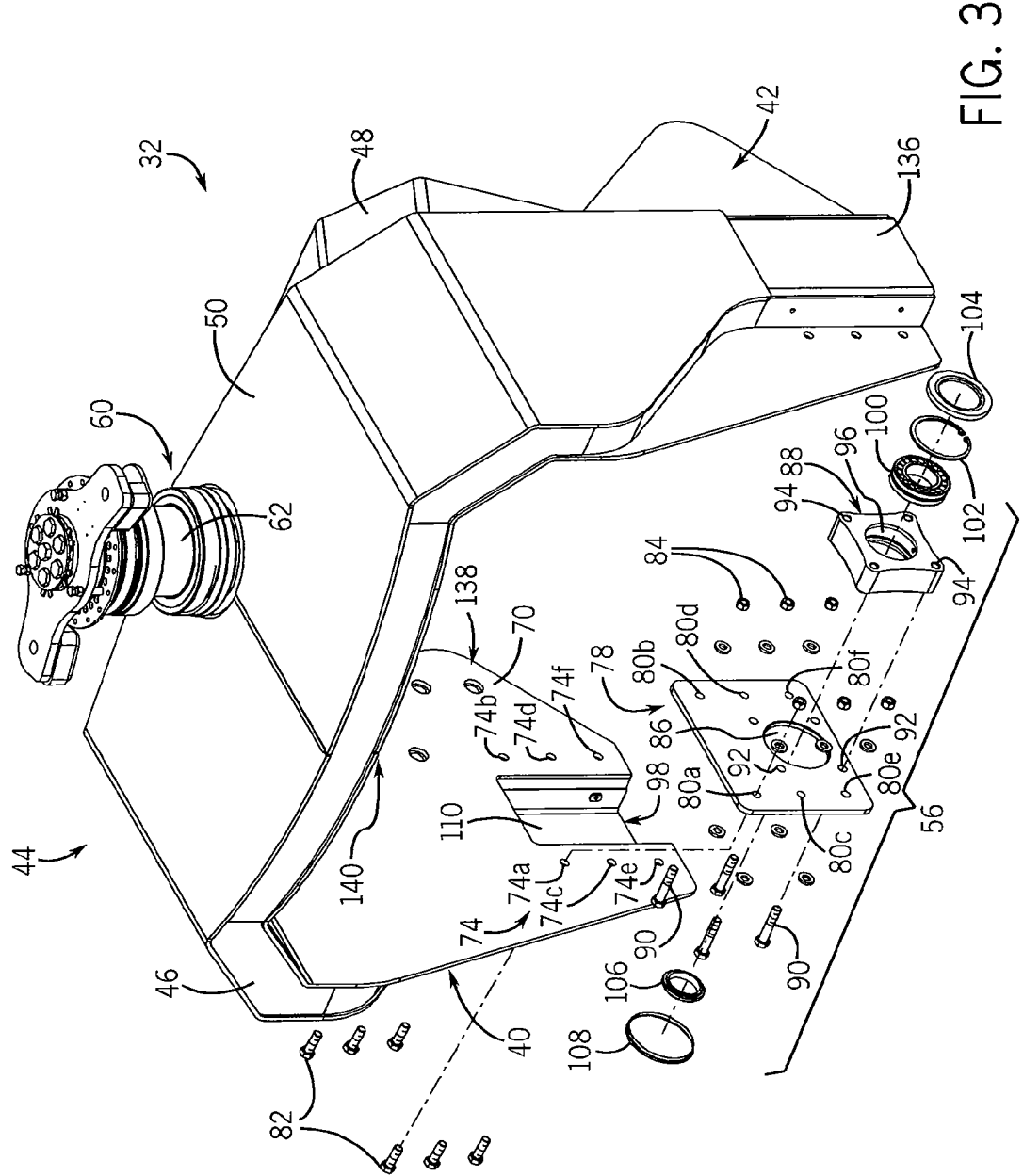
FIG. 3 is an exploded view of a left side of the front fork assembly.
Figure 4:
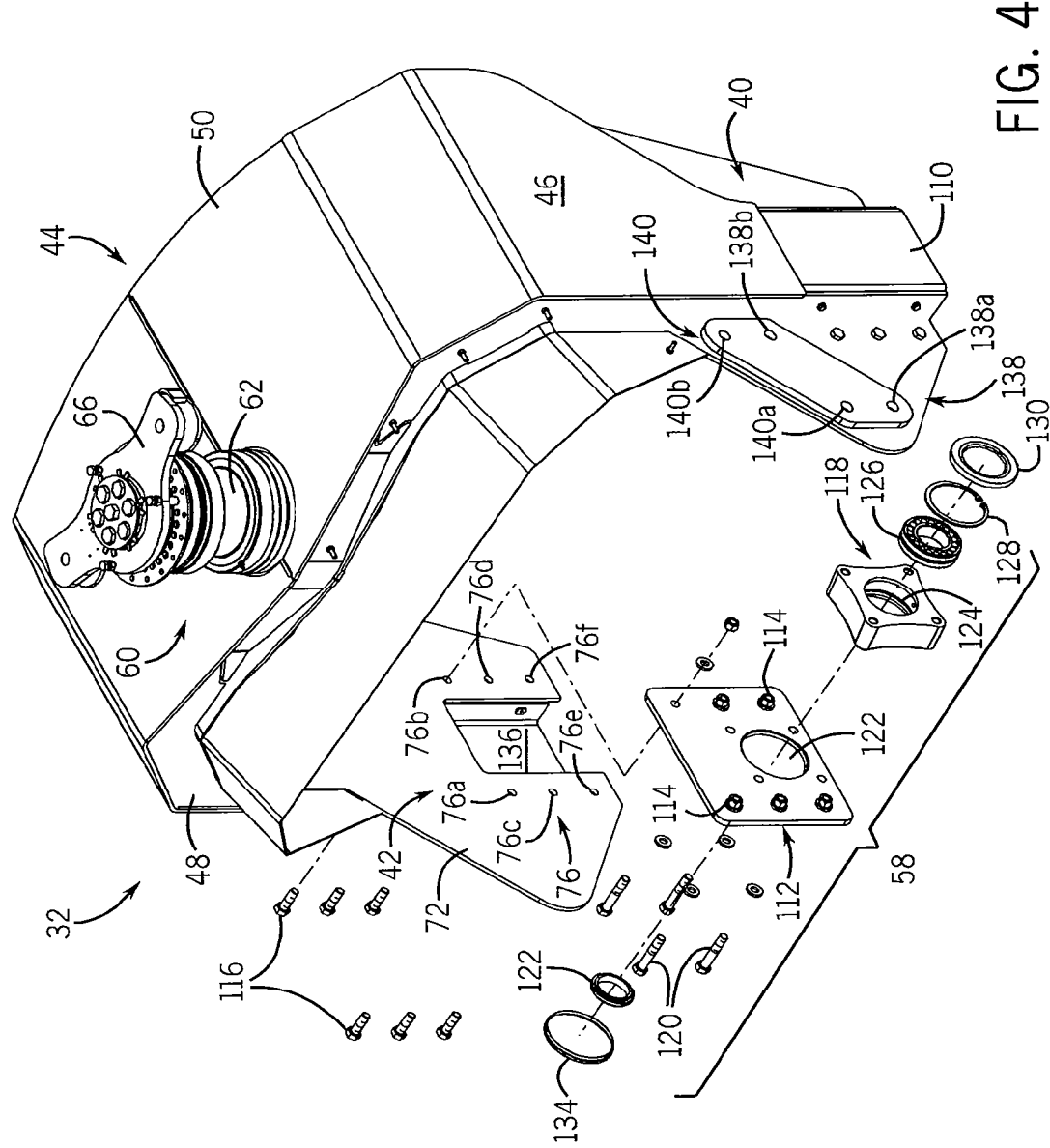
FIG. 4 is an exploded view of a right side of the front fork assembly.

Turning now to FIGS. 3 and 4, the front fork assembly 32 is designed to provide variable positioning of the front axle 30 to accommodate variability in the size of floatation tire used as part of the front wheel assembly 18. Generally, the smaller the diameter of the floatation tire, the higher the mounting of the front axle 30 relative to the first yoke portion 46 and the second yoke portion 48, and vice-versa. Accordingly, the inner surface 70 of reinforcement plate 40 and the inner surface 72 of the reinforcement plate 42 each contain a respective sextet of mounting points 74, 76. The mounting points 74, 76 in the illustrated embodiment are holes machined or otherwise formed in inner surfaces of the yoke portions. In the illustrated embodiment, the twelve mounting points define two pairs of mounting positions for the floatation tire 34, e.g., an upper position defined by mounting points 74a-d, 76a-d and a lower position defined by mounting points 74c-f, 76c-f. The upper mounting position is used when mounting a 66×43-25 sized tire and the lower mounting position is used when mounting a 73×44-32 sized tire. Alternately, the upper mounting position could be used for mounting a 1000 (or 1050)/50R25 sized tire and the lower mounting position could be used for mounting a 1050/50R32 sized tire. It is understood however that the other sized tires could be used with the floater 12. Moreover, while the illustrated floater 12 has been described as having two separate mounting positions for the front floatation tire 34, it is understood that the inner surfaces of the first and second yoke portions could be constructed to have mounting points that define more than two mounting positions for the front floatation tire 34. Additionally, while in one preferred embodiment, two of the mounting points for each sextet are used for both the upper and lower mounting positions, it is contemplated that separate mounting points could be used. For instance, the first and second yoke portions could be configured to each have an octet of mounting points to define the upper and lower mounting positions. Similarly, to accommodate additional variability in the size of tires usable with the floater 12, the octet of mounting points could be arranged to define three different mounting positions.

As noted above, the front axle 30 mounts to the front fork assembly 32 via bearing assemblies 56, 58. FIG. 3 shows the composition of bearing assembly 56 which is used to mount the right end of the front axle 30 (as viewed from the operator cab) to reinforcement plate 40 at either one of the upper and lower mounting positions depending on the size of the floatation tire supported by the axle. FIG. 4, which will be described below, shows the composition of bearing assembly 58 which is used to mount the left end of the front axle 30 (as viewed from the operator cab) to reinforcement plate 42 at either one of the upper and lower mounting positions. It is highly preferred that both ends of the front axle 30 be mounted to matched mounting positions, i.e., either to both upper mounting positions or to both lower mounting positions. Mismatching the mounting positions could cause damage to the axle, the floatation tire, or the front fork assembly.

Bearing assembly 56 consists of a bearing cover plate 78 that has through-holes 80a-f that align with the mounting points 74a-f. The bearing cover plate 78 mounts to the reinforcement plate 40 by bolts 82 and nuts 84. An enlarged opening 86 is formed in the bearing cover plate 78 and is offset vertically from the center of the bearing cover plate 78. Thus, when using the lower mounting position, the bearing cover plate 78 is rotated to the position shown in FIG. 3 with the enlarged opening 86 oriented below the horizontal centerline of the bearing cover plate 78. When using the upper mounting position, the bearing cover plate 78 is rotated 180 degrees so that the enlarged opening 86 is above the centerline of the bearing cover plate 78. Regardless of position, the through-holes 80 align with the mounting points 74. Hence, the bearing cover plate 78 is effectively a universal mounting plate.

The bearing assembly 56 further consists of a bearing housing 88 that mounts to the bearing cover plate 78 using bolts 90. In this regard, the bearing cover plate 78 further has holes 92 that align with holes 94 formed in the periphery of the bearing housing 88. Once aligned, bolts 90 can be passed through the respective holes and tightened down to secure the bearing housing 88 to the bearing cover plate 78. Regardless of position, e.g., upper position or lower position, the bearing housing 88 has a central opening 96 that is co-aligned with the enlarged opening 86 of the bearing cover plate 78. Both openings communicate with a rectangular shaped pocket 98 formed in the lower end of reinforcement plate 40.

Bearing assembly 56 further includes a bearing roller 100, clip ring 102, and double lip seal 104 that are seated in the central opening 96. The right end of the front axle 30 is secured in the bearing assembly 56 by lug 106 and cap 108. A bearing cover guard 110 is preferably secured to the outer surface of the reinforcement plate 40 to cover the bearing assembly 56, as best shown in FIG. 2.

Turning now to FIG. 4, the left-side bearing assembly 58 has a component makeup like that of the aforedescribed right-side bearing assembly 56. In this regard, bearing assembly 58 consists of a bearing cover plate 112 that mounts to the second yoke portion 48 by nuts 114 and bolts 116. A bearing housing 118 mounts to the bearing cover plate 112 by bolts 120. The bearing cover plate 112 has an enlarged opening 122 that is aligned with a central opening 124 formed in bearing housing 118. A bearing roller 126, a clip ring 128, and a double lip seal 130 are seated in the central opening 124, and the left-side of the front axle 30 is secured in the bearing housing 118 by lug 132 and cap 134. A bearing cover guard 136 is secured to the outer surface of the reinforcement plate 42 to cover the bearing assembly 58.

In a preferred embodiment, the floater 12 has a front wheel braking system (not shown). An exemplary front wheel braking system is described in U.S. Pat. No. 7,021,722, the disclosure of which is incorporated herein. As described in the aforementioned patent, which is assigned to CNH America LLC, the assignee of the present application, the braking system includes a front brake mechanism comprising a caliper assembly in combination with a disc brake configured to apply a braking force to the front wheel assembly 18. As known in the art, a caliper assembly interfaces with a disc brake (not shown) to slow and stop rotation of the front wheel assembly 18. The disc brake is fixed to rotate with the floatation tire 34 and the front axle 30 mounted to the yoke 44, as described above. A conventional front fork assembly for a three-wheel floater provides a single mounting location for the caliper assembly and that position is preferably upward and to the rear relative to the front axle 30, preferably at approximately a 45-degree angle relative to the horizontal. For a conventional front fork assembly, the mounting position is matched to the size of the floatation tire. As such, if a different sized tire is used, the caliper assembly may not be mounted properly to effectively apply braking pressure to the disc brake.

Accordingly, the present invention provides a front fork assembly 32 that defines multiple mounting positions for a caliper assembly. Turning now to FIGS. 3 and 4, two pairs of caliper mounting points 138, 140 are defined on the inner surface of reinforcement plate 40. In the illustrated embodiment, the mounting points 138, 140 are holes formed in the inner surface of the reinforcement plate 40. The pairs of holes are raised and offset rearwardly from the horizontal axis of the front axle 30. In this regard, the inner (lower) radial holes 138a, 138b define a first mounting position that is to be used when the lower bearing mounting position is being used and outer (upper) radial holes 140a, 140b define a second mounting position that is to be used when the upper bearing mounting position is being used. The illustrated embodiment provides two different mounting positions for the caliper assembly, which coincides with the number of mounting positions for the bearing assemblies.

Many changes and modifications could be made to the invention without departing from the spirit thereof. The scope of these changes will become apparent from the appended claims.

The invention claimed is:

1. A front fork assembly for use with a three-wheel agricultural floater, comprising:
   a yoke having an upper yoke portion, and a first yoke portion and a second yoke portion extending downwardly from generally opposite ends of the upper yoke portion;
   a first plurality of wheel mounting points formed on the first yoke portion;
   a second plurality of wheel mounting points formed on the second yoke portion;
   wherein a first portion of the first and second plurality of wheel mounting points defines a first wheel mounting arrangement;
   wherein a second portion of the first and second plurality of wheel mounting points defines a second wheel mounting arrangement; and
   wherein the first plurality of wheel mounting points includes three pairs of mounting points and the second plurality of wheel mounting points includes three pairs of mounting points.

2. The front fork assembly of claim 1 wherein the three pairs of mounting points of the first yoke portion are aligned with the three pairs of mounting points of the second yoke portion.

3. The front fork assembly of claim 1 wherein one pair of the first plurality of wheel mounting points and one pair of the second plurality of wheel mounting points form part of both the first wheel mounting arrangement and the second wheel mounting arrangement.

4. The front fork assembly of claim 1 wherein the first wheel mounting arrangement and the second wheel mounting arrangement define first and second discrete positions to which a single floatation wheel may be rotatably mounted to the yoke.

5. The front fork assembly of claim 4 wherein the first wheel mounting arrangement defines an upper wheel mounting position and the second wheel mounting arrangement defines a lower wheel mounting position.

6. The front fork assembly of claim 1 further comprising a first pair of brake caliper mounting points on the first yoke portion and a second pair of brake caliper mounting points on the second yoke portion.

7. The front fork assembly of claim 1 further comprising a kingpin assembly mounted to the upper yoke portion.

8. A agricultural applicator comprising:
   a chassis supported by a pair of rear floatation tires and a front floatation tire;
   a operator cab and fluid tank mounted to the chassis; and
   a front fork assembly mounted to a forward end of the chassis and configured to rotatably retain the front floatation tire, the front fork assembly having a floatation tire mounting arrangement that defines a pair of discrete mounting positions for the front floatation tire.

9. The agricultural applicator of claim 8 wherein the front fork assembly includes:
   a yoke having a first yoke portion and a second yoke portion extending downwardly from generally opposite ends of an upper yoke portion;
   a first plurality of tire mounting points formed on the first yoke portion;
   a second plurality of tire mounting points formed on the second yoke portion;
   a first tire mounting arrangement formed from selected mounting points of the first plurality and the second plurality of tire mounting points; and
   a second tire mounting arrangement, different from the first tire mounting arrangement, and formed from selected mounting points of the first plurality and the second plurality of tire mounting points.

10. The agricultural applicator of claim 9 wherein one of the first yoke portion and the second yoke portion define a pair of brake caliper mounting positions.

11. The agricultural applicator of claim 9 wherein the first plurality of tire mounting points includes three pairs of tire mounting points and the second plurality of tire mounting points includes three pairs of tire mounting points.

12. The agricultural applicator of claim 11 wherein one pair of the first plurality of tire mounting points and one pair of the second plurality of tire mounting points form part of both the first tire mounting arrangement and the second tire mounting arrangement.

13. The agricultural applicator of claim 12 wherein the first tire mounting arrangement defines an upper tire mounting position and the second tire mounting arrangement defines a lower tire mounting position.

14. A agricultural applicator comprising:
   a chassis supported by a pair of rear floatation tires and a front floatation tire;
   a operator cab mounted to the chassis;
   a front fork assembly mounted to a forward end of the chassis and configured to rotatably retain the front floatation tire; and means for mounting the front floatation tire to the front fork assembly at one of a pair of discrete mounting positions for the front floatation tire.

15. The agricultural applicator of claim 14 further comprising means for mounting a brake caliper assembly to the front fork assembly at one of a pair of discrete mounting positions.

16. The agricultural applicator of claim 14 wherein the mounting means includes two sets of mounting points integrally formed with the front fork assembly.

17. The agricultural applicator of claim 16 each set of mounting points includes a sextet of threaded holes configured to receive fasteners that attach a bearing assembly to the front fork assembly, wherein the front floatation tire is carried by an axle having an end received in the bearing assembly.

18. The agricultural applicator of claim 17 wherein the pair of discrete mounting positions includes an upper mounting position and a lower mounting position.

19. The agricultural applicator of claim 18 further comprising a fluid tank mounted to the chassis.

* * * * *